(12) United States Patent
Akyol et al.

(10) Patent No.: US 9,518,605 B2
(45) Date of Patent: Dec. 13, 2016

(54) RUNNING RING FOR A SLEEVE BEARING

(71) Applicant: Schaeffler Technologies AG & Co. KG, Herzogenaurach (DE)

(72) Inventors: Ekrem Akyol, Forchheim (DE); Heinz Schafers, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 69 days.

(21) Appl. No.: 14/437,982

(22) PCT Filed: Oct. 10, 2013

(86) PCT No.: PCT/DE2013/200213
§ 371 (c)(1),
(2) Date: Apr. 23, 2015

(87) PCT Pub. No.: WO2014/071930
PCT Pub. Date: May 15, 2014

(65) Prior Publication Data
US 2015/0285306 A1    Oct. 8, 2015

(30) Foreign Application Priority Data

Nov. 7, 2012    (DE) .......................... 10 2012 021 687

(51) Int. Cl.
*F16C 33/58*    (2006.01)
*F16C 33/66*    (2006.01)
(Continued)

(52) U.S. Cl.
CPC ............. *F16C 33/586* (2013.01); *F16C 19/26* (2013.01); *F16C 33/585* (2013.01); *F16C 33/64* (2013.01);
(Continued)

(58) Field of Classification Search
CPC ....... F16C 33/586; F16C 19/26; F16C 33/585; F16C 33/64; F16C 33/6614; F16C 33/6681; F16C 19/225
See application file for complete search history.

(56) References Cited

U.S. PATENT DOCUMENTS 3,253,869 A * 5/1966 Smith ................... F16C 19/466
384/564
3,311,432 A * 3/1967 Cowles ................. F16C 35/067
384/569

(Continued)

FOREIGN PATENT DOCUMENTS

| CN | 102016334 | 4/2011 |
|---|---|---|
| DE | 2651845 | 5/1978 |

(Continued)

*Primary Examiner* — Thomas R. Hannon
(74) *Attorney, Agent, or Firm* — Volpe and Koenig, P.C.

(57) ABSTRACT

A running ring (1) for a sleeve bearing, the running ring substantially including a cylindrical outer casing (3) or inner casing, the inner circumferential surface (5) or outer circumferential surface of which is formed as a raceway for bearing rollers, and two rims, which are formed on the axial end faces of the outer casing (3) or the inner casing and are oriented radially inward (7, 8) or outward, said rims being provided as an axial guide for the bearing rollers. According to the invention, the running ring (1) is characterized in that the two rims (7, 8) have a same wall thickness, and the two rims (7, 8) are produced by radially flanging over two grooves formed into the edge regions of the inner casing surface or the outer casing surface of a cylindrical starting sleeve, said grooves forming two recesses after the flanging process, wherein the recesses are arranged at a transition between the inner faces of the rims (7, 8) and the inner circumferential surface (5) of the outer casing (3) or the outer circumferential surface of the inner casing and are formed as lubricant reservoirs with a variable volume.

10 Claims, 3 Drawing Sheets

(51) Int. Cl.
*F16C 19/26* (2006.01)
*F16C 33/64* (2006.01)
(52) U.S. Cl.
CPC ....... *F16C 33/6614* (2013.01); *F16C 33/6681* (2013.01)

(56) References Cited

U.S. PATENT DOCUMENTS

| | | | | |
|---|---|---|---|---|
| 4,512,673 A | * | 4/1985 | Condon, Jr. | ............ F16C 19/26 |
| | | | | 384/569 |
| 4,887,918 A | * | 12/1989 | Kawachi | ................. F16C 43/06 |
| | | | | 384/560 |
| 4,964,742 A | * | 10/1990 | Kagawa | .................. F16C 33/60 |
| | | | | 384/492 |
| 5,848,846 A | * | 12/1998 | Sugiyama | ............. F16C 19/466 |
| | | | | 29/898.061 |
| 8,534,920 B2 | | 9/2013 | Aida et al. | |
| 8,661,686 B2 | * | 3/2014 | Oishi | .................... F04B 1/0417 |
| | | | | 148/659 |

FOREIGN PATENT DOCUMENTS

| | | |
|---|---|---|
| DE | 19513668 | 10/1996 |
| DE | 19649115 | 5/1998 |
| DE | 102006057450 | 6/2008 |
| DE | 102011004199 | 8/2012 |
| JP | 2008101647 | 5/2008 |
| JP | 2010133479 | 6/2010 |

\* cited by examiner

RUNNING RING FOR A SLEEVE BEARING

FIELD OF THE INVENTION

The invention relates to a running ring used, in particular, advantageously in housing-mounted or shaft-mounted sleeve bearings.

BACKGROUND

In roller bearing technology, it is generally known that sleeve bearings have the structural form of roller bearings that have the smallest radial overall height and make possible, in particular, room-saving and installation-friendly bearings with high radial load bearing capacity. Such sleeve bearings that can be pressed into a housing or onto a shaft are often used as an economical alternative to cylindrical roller bearings in automotive and mechanical engineering and are known in a construction as housing-mounted sleeve bearings, for example, from DE 195 12 668 A1. The running ring of such sleeve bearings essentially is formed, depending on the construction as a housing-mounted or shaft-mounted sleeve bearing, from a cylindrical outer casing or inner casing, whose inner circumferential surface or outer circumferential surface is constructed as a raceway for bearing rollers, as well as from two radially inward or outward directed rims that are formed on the axial end sides of the outer casing or inner casing and are provided as axial guidance of the bearing rollers.

The production of the running ring of this known sleeve bearing is realized according to the method described according to the method similarly described in DE 195 12 668 A1 such that first a pot-shaped drawn part including a base and a casing is formed from a round blank by a one-step or multi-step deep drawing process, wherein this drawn part is constructed slightly longer than the axial width plus a rim height of a running ring and its casing has reduced thickness on its side facing away from the base. In a second processing step, a central part of the base is punched from the drawn part so that a first rim designated as fixed rim is produced on the running ring and in a third processing step the casing of the drawn part is cut in the area of its reduced thickness, in order to remove the non-uniform drawn edge on the drawn part. Then, in a fourth processing step, the casing is flanged radially inward over a flange edge at the beginning of the reduced thickness, so that a second rim designated as flanged rim is produced with a small recess on the running ring, and finally, the formed flanged rim is corrected to the diameter of the fixed rim in a fifth processing step by a drilling process.

A disadvantage in the running rings produced by this method, however, is that their rims have different thicknesses due to the production, so that the sleeve bearings formed with such running rings must always be mounted directed into/onto their bearing seat. This is necessary because the shafts to be supported are typically constructed with a profile adapted to the shaft bending in the raceway region, so that, for an inverted side installation of the roller bearing, the roller set is loaded eccentrically and this could cause a dangerous axial thrust in the roller bearing. In addition, the known running rings have the disadvantage that the running ring constructed with the fixed rim is typically completely hardened and the flanged rim side is soft-annealed again, to be able to close this side after placement of the roller ring. Soft-annealing the flanged rim side, however, also unavoidably softens part of the raceway area, so that the raceway experiences increased wear at this point, which reduces the service life of the roller bearing. It has also proven disadvantageous in such running rings that these have a small volume-limited recess only on the flanged rim, wherein this recess can be used as an additional lubricant reservoir, so that the sleeve bearing must be supplied with more lubricant at relatively short intervals or has only a relatively short service life. The described production of these running rings also has the disadvantage that relatively high sectioning and tool costs result due to the relatively high number of required production steps for each running ring.

SUMMARY

Starting from the mentioned disadvantages of the known prior art, the objective of the invention is thus to design a running ring that can be produced economically for a sleeve bearing and guarantees longer re-lubrication intervals or a longer service life for the sleeve bearing and which can eliminate the need for oriented installation of the sleeve bearing.

This objective is met according to the invention for a running ring in which both rims have the same thickness and both rims are produced by radial flanging over two grooves that are formed in the edge regions of the inner casing surface or outer casing surface of a hollow cylindrical starting sleeve and form, after the flanging process, two recesses that are arranged at the transition of the inner sides of the rims to the inner circumferential surface of the outer casing or to the outer circumferential surface of the inner casing and are constructed as variable volume lubricant reservoirs.

Preferred constructions and improvements of the running ring constructed according to the invention are described below and in the claims.

According to one aspect, it is provided in the running ring constructed according to the invention that both rims also have the same length and their thickness corresponds at least approximately to the thickness of the cylindrical outer casing or inner casing. Slight differences between the thicknesses of the cylindrical outer casing or inner casing and also the rims can be produced by material deformation due to flanging of the rims and/or due to a cutting processing of the inner circumferential surface of the outer casing or outer circumferential surface of the inner casing constructed as a raceway together with the inner sides of the rims.

According to another aspect, another feature of the running ring constructed according to the invention is that the hollow cylindrical starting sleeve is formed by a sectioned ring section of a pipe or a cartridge-shaped deep drawn part with uniform thickness and separated base. The use of pipes for separating the starting sleeve has proven most economical for the production of large numbers of parts of sleeve bearings with identical outer diameters, while the use of cartridge-shaped deep drawn parts is more economical for the production of smaller numbers of parts of sleeve bearings with different outer diameters.

According to another aspect, the sleeve bearings constructed according to the invention is also distinguished in that the forming of the grooves in the edge regions of the inner casing surface or outer casing surface of the starting sleeve is preferably realized by a plunge cut turning method. Alternatively, it is also possible to form the grooves without cutting by rolling or the like, because the grooves can be machined with simple one-axis turning machines in the starting sleeves, which are more economical in production relative to rolling machines. In addition, with the plunge cut turning, the width for the grooves must be designed so that the raceway for the bearing rollers is larger than for solid roller bearings with the same dimensions, so that a larger load bearing length of the bearing rollers increases the bearing load of the sleeve bearing.

For a running ring according to another embodiment, which is produced in a known way from a single pot-shaped deep drawn part and in which one rim is produced by the punching of a circular central part of the base of the deep drawn part, the objective of the invention is achieved in a similar way in that both rims also have the same thickness and only the other rim is produced by radial flanging over a groove that is formed in the free edge region of the inner casing surface of the deep drawn part and forms, after the flanging process, a recess that is arranged at the transition of the inner side of the rim to the inner circumferential surface of the outer casing and is constructed as a variable volume lubricant reservoir.

In this embodiment of a running ring constructed according to the invention, both rims have the same length and their thickness corresponds at least approximately to the thickness of the cylindrical outer casing. Forming the groove in the edge region of the inner circumferential surface of the deep drawn part is here produced, preferably without cutting by rolling, but could also be realized with cutting by a plunge cut turning method.

Finally, another common feature of the two previously described embodiments of a running ring constructed according to the invention is that the starting sleeve or the deep drawn part is made from a through-hardened steel, for example, from 100Cr6, C80, or C45, or from a case-hardened steel, for example, from 16MnCr5, C16, or 17Cr13. These materials are distinguished by good deformability or special suitability for stretch forming and are especially suitable for sleeve bearings due to their good roll-over properties.

In summary, compared with the running rings known from the prior art, the running ring constructed according to the invention for a sleeve bearing thus has, in all three described embodiments, the advantage that it has two rims with the same rim thickness, so that a sleeve bearing constructed with this running ring no longer has to be mounted in an oriented arrangement. Through the arrangement of one or two recesses at the transition of the inner sides of the flanged rims to the inner circumferential surface of the outer casing or to the outer circumferential surface of the inner casing, a sleeve bearing constructed with such a running ring also has a larger lubricant reservoir than a conventional sleeve bearing, so that the re-lubrication intervals and/or the service life of the sleeve bearing are made significantly longer. This increased lubricant reservoir can also have a variable form in volume or radial extent, in that the grooves forming the base of the recesses are constructed in the running ring with different axial widths.

BRIEF DESCRIPTION OF THE DRAWINGS

The running ring formed according to the invention for a sleeve bearing is explained in more detail below using several different embodiments with reference to the accompanying drawings. Shown are.

DETAILED DESCRIPTION OF THE PREFERRED EMBODIMENTS

Figure 2:
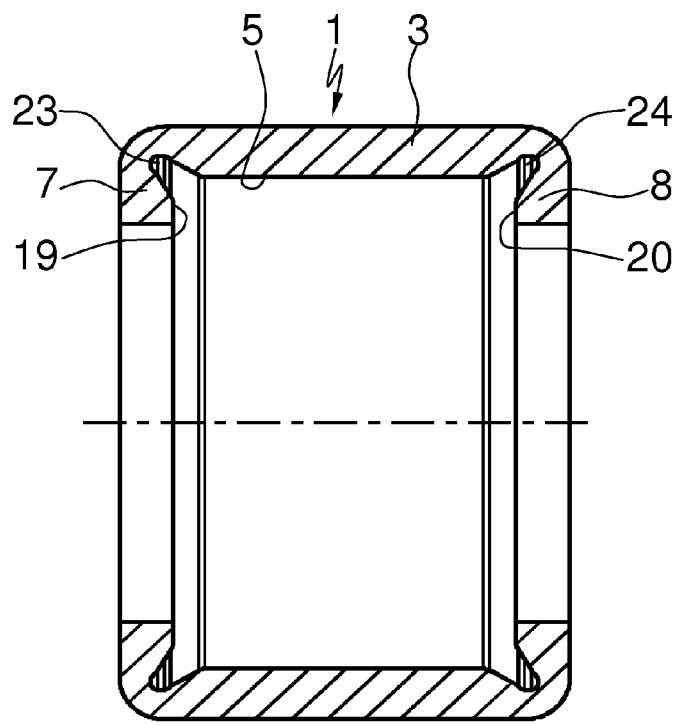
Figure 4:
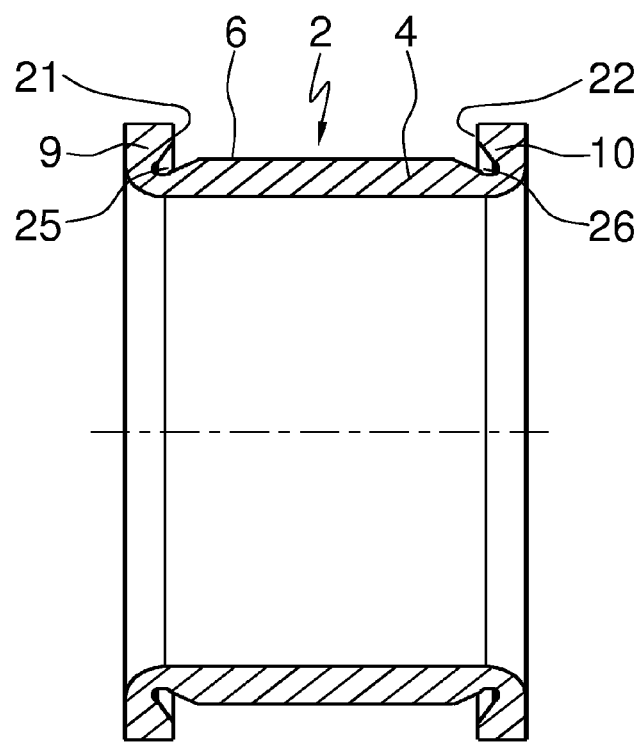

FIGS. 2 and 4 clearly show a first and a second embodiment of running rings 1, 2 like those typically used for housing-mounted or shaft-mounted sleeve bearings. These running rings 1, 2 each include, in a known way, a cylindrical outer casing 3 or inner casing 4, whose inner circumferential surface 5 or outer circumferential surface 6 is constructed as a raceway for not-shown bearing rollers, as well as from two radially inward or outward directed rims 7, 8 or 9, 10 that are formed on the axial end sides of the outer casing 3 or inner casing 4 and are provided as axial guidance for the not-shown bearing rollers.

Figure 1:
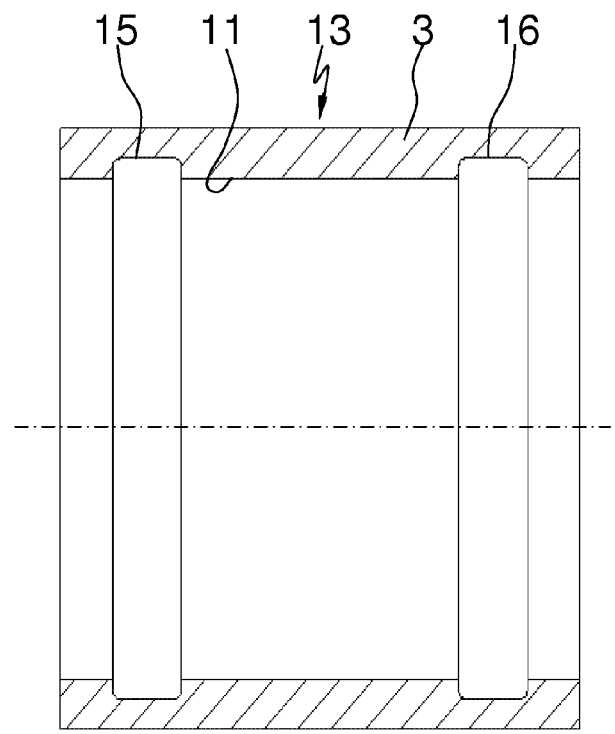
FIG. 1 a cross section of a running ring constructed according to the invention in a housing-mounted sleeve bearing before the flanging of the rim, FIG. 2 a cross section of the running ring constructed according to the invention according to FIG. 1 with flanged rims, FIG. 3 a cross section of a running ring constructed according to the invention of a shaft-mounted sleeve bearing before the flanging of the rim, FIG. 4 a cross section of the running ring constructed according to the invention according to FIG. 3 with flanged rims, FIG. 5 a cross section of a running ring constructed according to the invention produced from a deep drawn part of a housing-mounted sleeve bearing before the flanging of the rim, and FIG. 6 a cross section of the running ring constructed according to the invention according to FIG. 5 with flanged rim.
Figure 3:
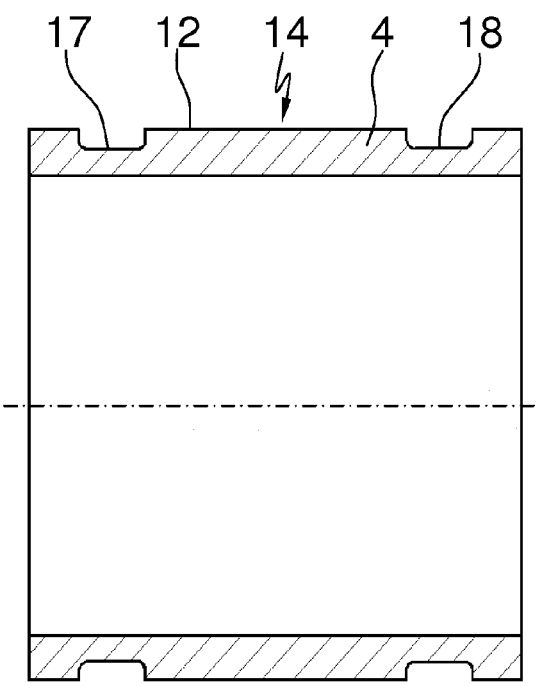

In addition, from FIGS. 2 and 4 it emerges that both rims 7, 8 or 9, 10 of the running rings 1, 2, in contrast to conventional running rings, have the same thickness and also the same length and their thickness corresponds at least approximately to the thickness of the cylindrical outer casing 3 or inner casing 4. Together with FIGS. 1 and 3, it is also clearly identifiable that both rims 7, 8 or 9, 10 are produced by radial flanging over two grooves 15, 16 or 17, 18 that are formed in the edge regions of the inner casing surface 11 or outer casing surface 12 of a hollow cylindrical starting sleeve 13 or 14 and form, after the flanging process, two recesses 23, 24 or 25, 26 that are arranged at the transition of the inner sides 19, 20 or 21, 22 of the rims 7, 8 or 9, 10 to the inner circumferential surface 5 of the outer casing 3 or to the outer circumferential surface 6 of the inner casing 4 and are constructed as variable volume lubricant reservoirs. The hollow cylindrical sleeves 13, 14 are here constructed as sectioned ring sections of a pipe in whose edge regions the grooves 15, 16 or 17, 18 are machined either in the inner casing surface 11 or in the outer casing surface 12 by plunge cut turning.

Figure 5:
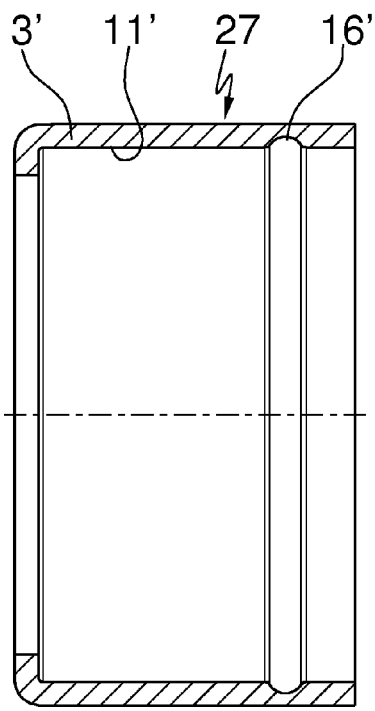
Figure 6:
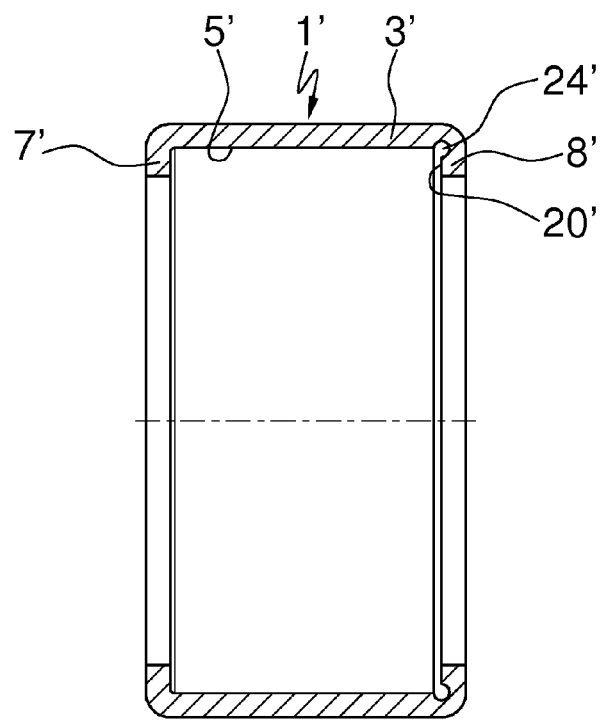

In FIG. 6, a third embodiment of a running ring 1' for a housing-mounted sleeve bearing is also shown that is produced from an individual pot-shaped deep drawn part 27 shown in FIG. 5 and also essentially from a cylindrical outer casing 3', whose inner circumferential surface 5' is constructed as a raceway for bearing rollers, as well as from two radially inward directed rims 7', 8' that are formed on the axial end sides of the outer casing 3' and are provided as axial guidance of the bearing rollers, wherein one rim 7' is produced by punching of a circular central part of the base of the deep drawn part 27. This embodiment also distinguishes itself in that both rims 7', 8' that have the same thickness differ from the first and second embodiment in that only the other rim 8' is produced by radial flanging over a groove 16' that is formed in the free edge region of the inner casing surface 11' of the deep drawn part 27 and forms, after the flanging process, a recess 24' that is arranged at the transition of the inner side 20' of the rim 8' to the inner circumferential surface 5' of the outer casing 3' and is constructed as a variable volume lubricant reservoir. In this embodiment of a running ring 1' it is also provided that both rims 7', 8' have the same length and their thickness corresponds at least approximately to the thickness of the cylindrical outer casing 3' and the forming of the groove 15' in the edge region of the inner casing surface 11' of the deep drawn part 27 is realized by plunge cut turning.

| List of reference numbers | |
|---|---|
| 1 | Housing-mounted running ring |
| 1' | Running ring from a deep drawn part |
| 2 | Shaft-mounted running ring |
| 3 | Outer casing of 1 |
| 3' | Outer casing of 1' |
| 4 | Inner casing of 2 |
| 5 | Inner circumferential surface of 1 |
| 5' | Inner circumferential surface of 1' |
| 6 | Outer circumferential surface of 2 |
| 7 | Left rim of 1 |
| 7' | Left rim of 1' |
| 8 | Right rim of 1 |
| 8' | Right rim of 1' |
| 9 | Left rim of 2 |
| 10 | Right rim of 2 |
| 11 | Inner casing surface of 13 |
| 11' | Inner casing surface of 27 |
| 12 | Outer casing surface of 14 |
| 13 | Starting sleeve of 1 |
| 14 | Starting sleeve of 2 |
| 15 | Left groove in 11 |
| 15' | Groove in 11' |
| 16 | Right groove in 11 |
| 17 | Left groove in 12 |
| 18 | Right groove in 12 |
| 19 | Inner side of 7 |
| 19' | Inner side of 7' |
| 20 | Inner side of 8 |
| 21 | Inner side of 9 |
| 22 | Inner side of 10 |
| 23 | Recess between 19 and 5 |
| 23' | Recess between 19'and 5' |
| 24 | Recess between 20 and 5 |
| 25 | Recess between 21 and 6 |
| 26 | Recess between 22 and 6 |
| 27 | Deep drawn part |

The invention claimed is:

1. A running ring for a sleeve bearing, comprising a cylindrical outer casing or inner casing, having an inner circumferential surface or outer circumferential surface constructed as a raceway for bearing rollers, and two radially inward or outward directed rims formed on axial end sides of the outer casing or the inner casing are provided as axial guidance for the bearing rollers, both of the rims have a same thickness and both of the rims are produced by radial flanging over two grooves formed in edge regions of the surface of the inner casing or the outer casing of a hollow cylindrical starting sleeve and form, after the flanging process, two recesses that are arranged at a transition of inner sides of the rims to the inner circumferential surface of the outer casing or to the outer circumferential surface of the inner casing and form variable volume lubricant reservoirs.

2. The running ring according to claim 1, wherein both of the rims also have a same length and a thickness that corresponds at least approximately to a thickness of the cylindrical outer casing or the inner casing.

3. The running ring according to claim 1, wherein the hollow cylindrical starting sleeve is formed by a sectioned ring section of a pipe or a cartridge-shaped deep drawn part with uniform thickness and separated bases.

4. The running ring according to claim 1, wherein a shaping of the grooves in the edge regions of the inner casing surface or the outer casing surface of the starting sleeve is realized by a plunge cut turning method.

5. A running ring for a sleeve bearing produced from an individual pot-shaped deep drawn part and comprising a cylindrical outer casing with an inner circumferential surface constructed as a raceway for bearing rollers, and two radially inwardly directed rims that are formed on axial end sides of the outer casing and are provided for axial guidance of the bearing rollers, one of the rims is produced by punching of a circular, central part of a base of the deep drawn part, both of the rims have a same thickness and the other rim is produced by radial flanging over a groove that is formed in a free edge region of an inner casing surface of the deep drawn part and forms, after the flanging process, a recess that is arranged at a transition of an inner side of the rim to the inner circumferential surface of the outer casing and forms a variable volume lubricant reservoir.

6. The running ring according to claim 5, wherein both of the rims have a same length and the thickness of the rims corresponds at least approximately to a thickness of the cylindrical outer casing.

7. The running ring according to claim 5, wherein the forming of the groove in the edge region of the inner casing surface of the deep drawn part is produced by rolling without cutting.

8. The running ring according to claim 5, wherein the deep drawn part is made from a through-hardened steel or from a case-hardened steel.

9. The running of claim 8, wherein the through-hardened steel is 100Cr6, C80, or C45.

10. The running of claim 8, wherein the case-hardened steel is 16MnCr5, C16, or 17Cr13.

* * * * *